United States Patent
Shirahige

(10) Patent No.: US 10,929,306 B2
(45) Date of Patent: Feb. 23, 2021

(54) ARITHMETIC PROCESSOR, INFORMATION PROCESSING APPARATUS, AND CONTROL METHOD OF ARITHMETIC PROCESSOR

(71) Applicant: FUJITSU LIMITED, Kawasaki (JP)

(72) Inventor: Yuji Shirahige, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 3 days.

(21) Appl. No.: 16/418,018

(22) Filed: May 21, 2019

(65) Prior Publication Data

US 2019/0377686 A1 Dec. 12, 2019

(30) Foreign Application Priority Data

Jun. 7, 2018 (JP) .............................. JP2018-109705

(51) Int. Cl.
*G06F 12/1009* (2016.01)
*G06F 12/1027* (2016.01)
*G06F 12/0891* (2016.01)

(52) U.S. Cl.
CPC ...... *G06F 12/1009* (2013.01); *G06F 12/0891* (2013.01); *G06F 12/1027* (2013.01)

(58) Field of Classification Search
CPC ............. G06F 12/1009; G06F 12/0891; G06F 12/1027; G06F 12/00; G06F 13/00
See application file for complete search history.

(56) References Cited

U.S. PATENT DOCUMENTS

| 5,586,283 A * | 12/1996 | Lopez-Aguado ........................ G06F 12/1027 711/206 |
| 6,715,057 B1 * | 3/2004 | Kessler ............... G06F 12/1009 711/207 |
| 2010/0070708 A1 | 3/2010 | Maruyama |
| 2011/0010521 A1 | 1/2011 | Wang et al. |

FOREIGN PATENT DOCUMENTS

| JP | 2012-533135 | 12/2012 |
| WO | 2008/155825 | 12/2008 |
| WO | 2011/008702 | 1/2011 |

* cited by examiner

*Primary Examiner* — Tuan V Thai
(74) *Attorney, Agent, or Firm* — Fujitsu Patent Center

(57) ABSTRACT

An arithmetic processor includes a request generation circuit which generates an information request including a request address. A translation buffer associates a virtual address of a page with a physical address (PA). A page-table buffer associates data in a page table in a level other than the last level with a PA of the data, and stores the associated data and address. A controller circuit obtains, from the request address, a PA of data in a page table to be accessed when the request address is not stored in the translation buffer. The controller circuit searches in the page-table buffer for the data when the page table to be accessed is in a level other than the last level. The controller circuit obtains the data from a memory, such as a cache memory or a main memory, when the page table to be accessed is in the last level, and registers the data in the translation buffer. The translation buffer may output an erase signal to invalidate all entries in (Continued)

the page-table buffer. The page-table buffer may include a control queue which outputs a control signal indicating a least recently used (LRU) entry.

11 Claims, 10 Drawing Sheets

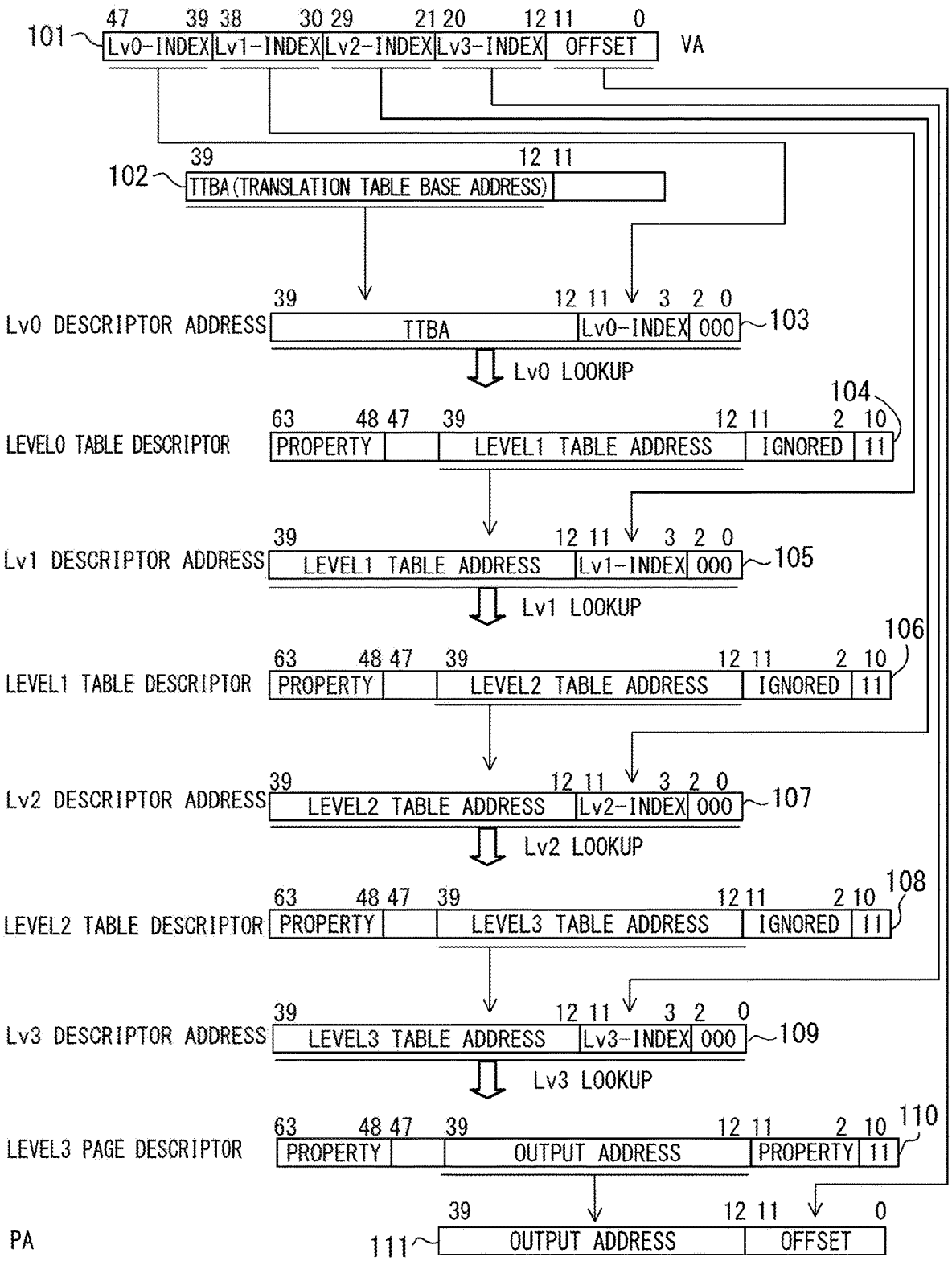
F I G. 1

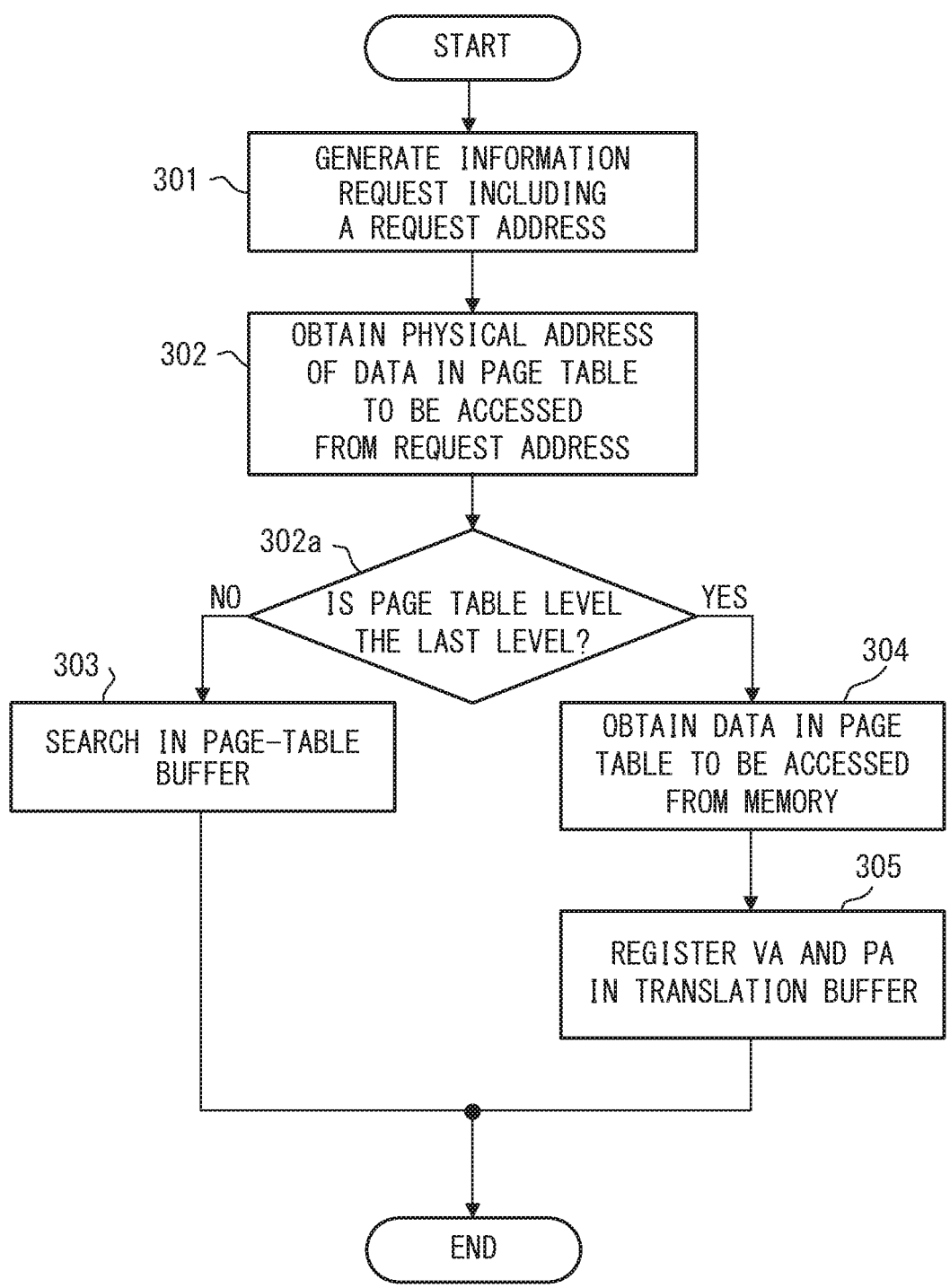
F I G. 3

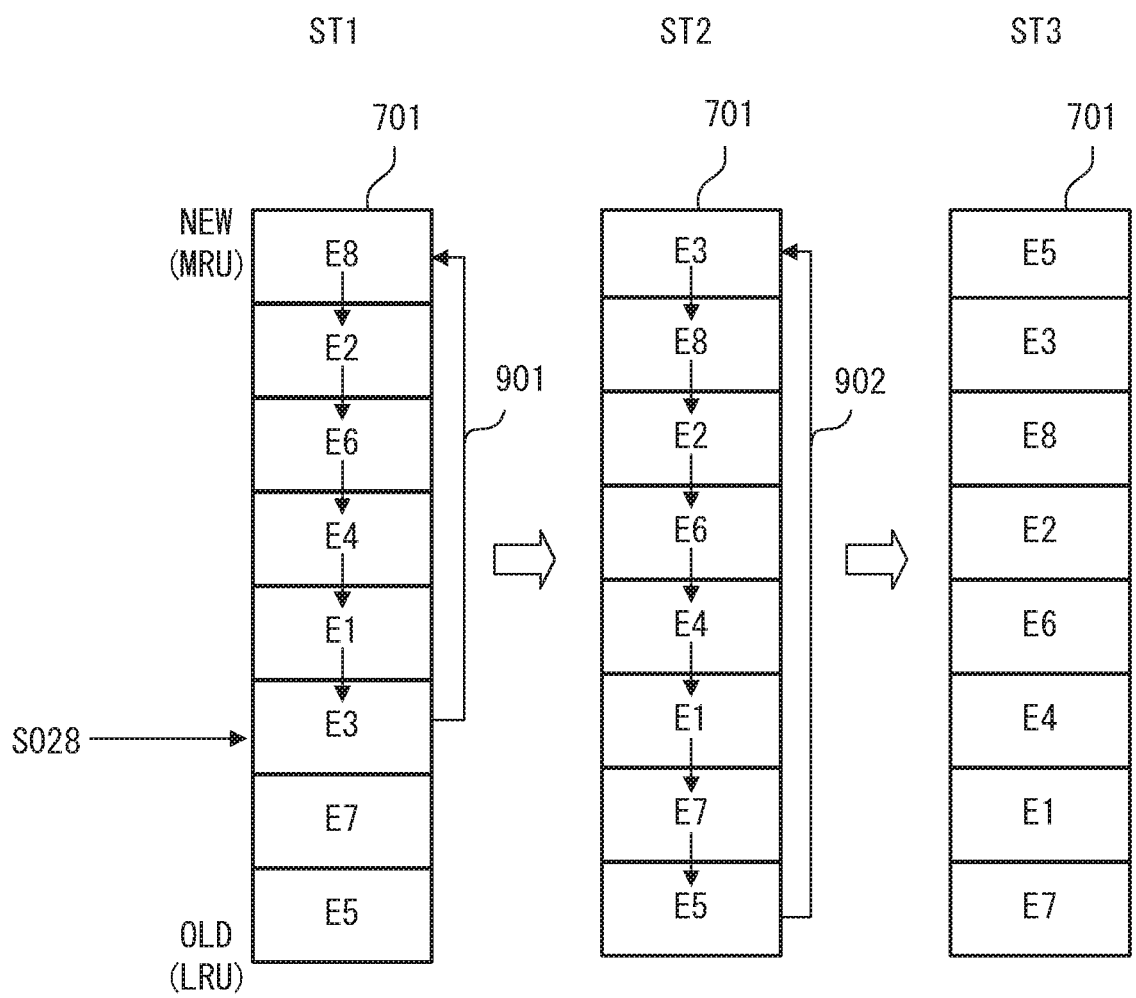
F I G. 9

ARITHMETIC PROCESSOR, INFORMATION PROCESSING APPARATUS, AND CONTROL METHOD OF ARITHMETIC PROCESSOR

CROSS-REFERENCE TO RELATED APPLICATION

This application is based upon and claims the benefit of priority of prior Japanese Patent Application No. 2018-109705, filed on Jun. 7, 2018, the entire contents of which are incorporated herein by reference.

TECHNICAL FIELD

The embodiments discussed herein relate to an arithmetic processor, an information processing apparatus, and a control method of the arithmetic processor.

BACKGROUND

Central Processing Units (CPUs), which are arithmetic processors, often have hardware installed for supporting virtual addresses in recent years. For example, a Translation Lookaside Buffer (TLB) is a hardware circuit for caching a translation pair of a virtual address (VA) and a physical address (PA). Entries registered in a TLB are obtained by a page-table walk.

Regarding the page-table walk, a memory-management unit (MMU) that is configured to retain a block of data including multiple page table entries has been known (See patent document 1 for example). In addition, an arithmetic processor that reduces a penalty at the time of a TLB miss has been known (see patent document 2 for example).

Patent Document 1: Japanese National Publication JP 2012-533135
Patent Document 2: International Publication No. WO2008/155825

SUMMARY

According to one embodiment, an arithmetic processor includes a request generation circuit, a translation buffer, a page-table buffer, and a controller circuit.

The request generation circuit generates an information request including a request address. The translation buffer associates a virtual address of a page with a physical address of the page and stores the virtual address and the physical address. The page-table buffer associates data in a page table in a level other than the last level with a physical address of the data in the page table and stores the data in the page table and the physical address of the data in the page table.

The controller circuit obtains, from the request address, a physical address of data in a page table to be accessed when a virtual address that corresponds to the request address is not stored in the translation buffer. The controller circuit searches in the page-table buffer for the data in the page table to be accessed when the page table to be accessed is in a level other than the last level. On the other hand, the controller circuit obtains, from a memory, the data in the page table to be accessed when the page table to be accessed is a page table in the last level and registers, in the translation buffer, a virtual address and a physical address of a page indicated by the obtained data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a page-table walk performed by a hardware circuit;
FIG. 3 is a flowchart illustrating a control method of an arithmetic processor;
FIG. 9 is a diagram illustrating a configuration of a control queue.

DESCRIPTION OF EMBODIMENTS

Figure 2:
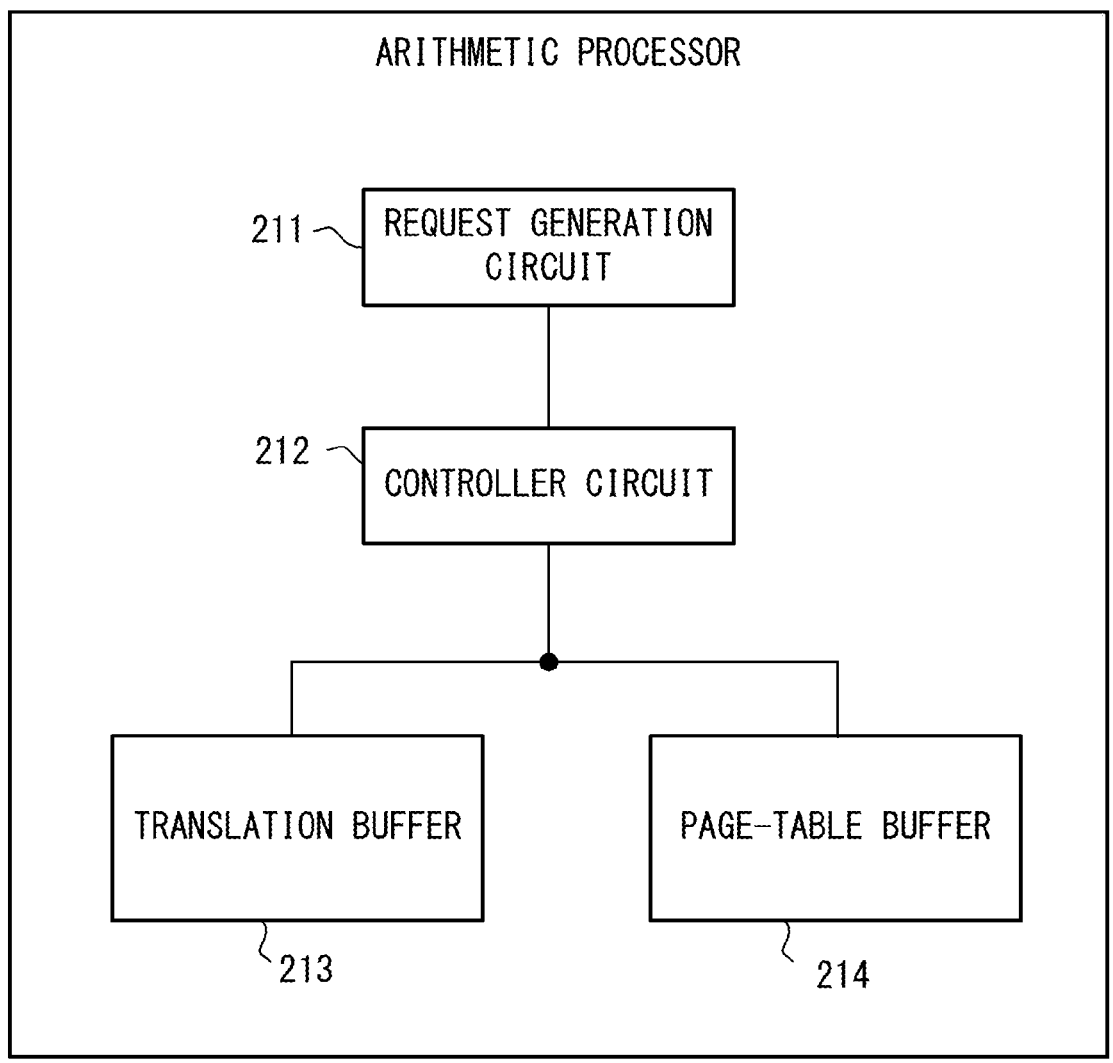
FIG. 2 is a diagram illustrating a configuration of an arithmetic processor.

Details of the embodiments are explained below with reference to the drawings.

A page-table walk performed at the time of a TLB miss may be performed by a hardware circuit or may be performed by software. In either case, one or more page tables are to be looked up, and there are various patterns to look up the page tables.

When a multilevel page table, which is comprised of multiple page tables, is looked up, because of an increase in the number of times that page table entries are obtained from a main memory, the page-table walk takes considerable time. As the number of TLB entries is increased, the probability of a hit in TLB will also be increased, and the number of times that the page-table walk is performed will be reduced. However, this is not sufficient, and the time period to execute the page-table walk is desirably reduced to the shortest possible time.

FIG. 1 illustrates an example of a page-table walk performed by a hardware circuit. A CPU generates a data request that includes a virtual address (VA) 101 of data to be accessed as a request address. The VA 101 includes Lv0-index to Lv3-index and an offset.

A base register 102 stores a Translation Table Base Address (TTBA). TTBA indicates a storage position of a page table in Level 0 in a main memory.

Lvj-index (j=0 to 3) is an index indicating a storage position of an entry to be accessed within a Level-j page table. Page tables in Level 0 to Level 3 correspond to a four-level (multilevel) page table, and with the multilevel page table, a page table in Level 3 is a page table in the last level.

Lvj Descriptor Address (j=0 to 2) stores a Level-j table Descriptor that is an entry of a page table in Level j. Lv3 Descriptor Address stores a Level3 page Descriptor that is an entry of a page table in Level 3. Lvj Descriptor Address (j=0 to 3) is a physical address in the main memory, and Lvj Lookup represents an operation of looking up in a page table in Level j in the main memory.

The hardware circuit, first, adds Lv0-index to TTBA in the base register 102 to generate a Lv0 Descriptor Address 103. The hardware circuit then looks up a Level10 table Descriptor 104 stored at the Lv0 Descriptor Address 103 in the main memory.

Next, the hardware circuit adds Lv1-index to Level1 Table Address in the Level0 table Descriptor 104 to generate a Lv1 Descriptor Address 105. The hardware circuit looks up a Level1 table descriptor 106 stored at the Lv1 Descriptor Address 105 in the main memory.

Next, the hardware circuit adds Lv2-index to Level2 Table Address in the Level1 table Descriptor 106 to generate a Lv2 Descriptor Address 107. The hardware circuit looks up a Level2 table Descriptor 108 stored at the Lv2 Descriptor Address 107 in the main memory.

Next, the hardware circuit adds Lv3-index to Level3 Table Address in the Level2 table Descriptor 108 to generate a Lv3 Descriptor Address 109. The hardware circuit looks up a Level3 page Descriptor 110 stored at the Lv3 Descriptor Address 109 in the main memory.

The hardware circuit then adds an offset to an Output Address in the Level3 page Descriptor 110 to generate a physical address (PA) 111 of the data to be accessed.

In this case, because a lookup operation in a page table of the main memory is performed four times, when a page table entry is obtained from the main memory for each lookup, execution time of the page-table walk becomes long.

Here, a method of caching a page table entry in an L1 cache is a possible solution. The execution time can be reduced when a page table entry is obtained from the L1 cache. However, since the L1 cache may be used for purposes other than address translations, taking the frequency of TLB miss occurrence into account, a likelihood of the page table entry remaining in the L1 cache at the time of the next page-table walk is low. As a result, even when the L1 cache is used, the page table entry is likely to be obtained from the main memory.

In the MMU described in Patent Document 1 (Japanese National Publication JP 2012-533135, which is a patent family member of US 2011/0010521), a prefetch buffer is provided in addition to the L1 cache so as to cache a page table entry, and at the time of a TLB miss, a lookup is performed in the entries in the prefetch buffer. This method is considered to be effective in reducing latency of entries of the first touch. However, as the number of entries in a prefetch buffer is increased to obtain a sufficient effect, the hardware scale will also increase.

FIG. 2 illustrates an example of configuration of an arithmetic processor. The arithmetic processor 201 in FIG. 2 includes a request generation circuit 211, a controller circuit 212, a translation buffer 213, and a page-table buffer 214. The request generation circuit 211, the controller circuit 212, the translation buffer 213, and the page-table buffer 214 are hardware circuits.

The translation buffer 213 associates a virtual address of a page with a physical address of the page and stores the associated addresses. The page-table buffer 214 associates data in a page table in a level other than the last level with a physical address of the data and stores the associated data and address.

FIG. 3 is a flowchart illustrating an example of a control method of the arithmetic processor 201 in FIG. 2. The request generation circuit 211, first, generates an information request including a request address (step 301). When a virtual address corresponding to the request address is not stored in the translation buffer 213, the controller circuit 212 obtains a physical address of data in a page table to be accessed from the request address (step 302) and checks the level of the page table to be accessed (step 302a).

When the page table to be accessed is a page table in a level other than the last level (step 302a, NO), the controller unit 212 searches in the page-table buffer 214 for data in the page table to be accessed (step 303).

Meanwhile, when the page table to be accessed is a page table of the last level (step 302a, YES), the controller circuit 212 obtains data in the page table to be accessed from a memory (step 304). The controller circuit 212 then registers the virtual address and the physical address in the page indicated by the obtained data in the translation buffer 213 (step 305).

The arithmetic processor 201 in FIG. 2 enables reduction of hardware for retaining data of a page table used by the arithmetic processor 201 for address translation.

Figure 4:
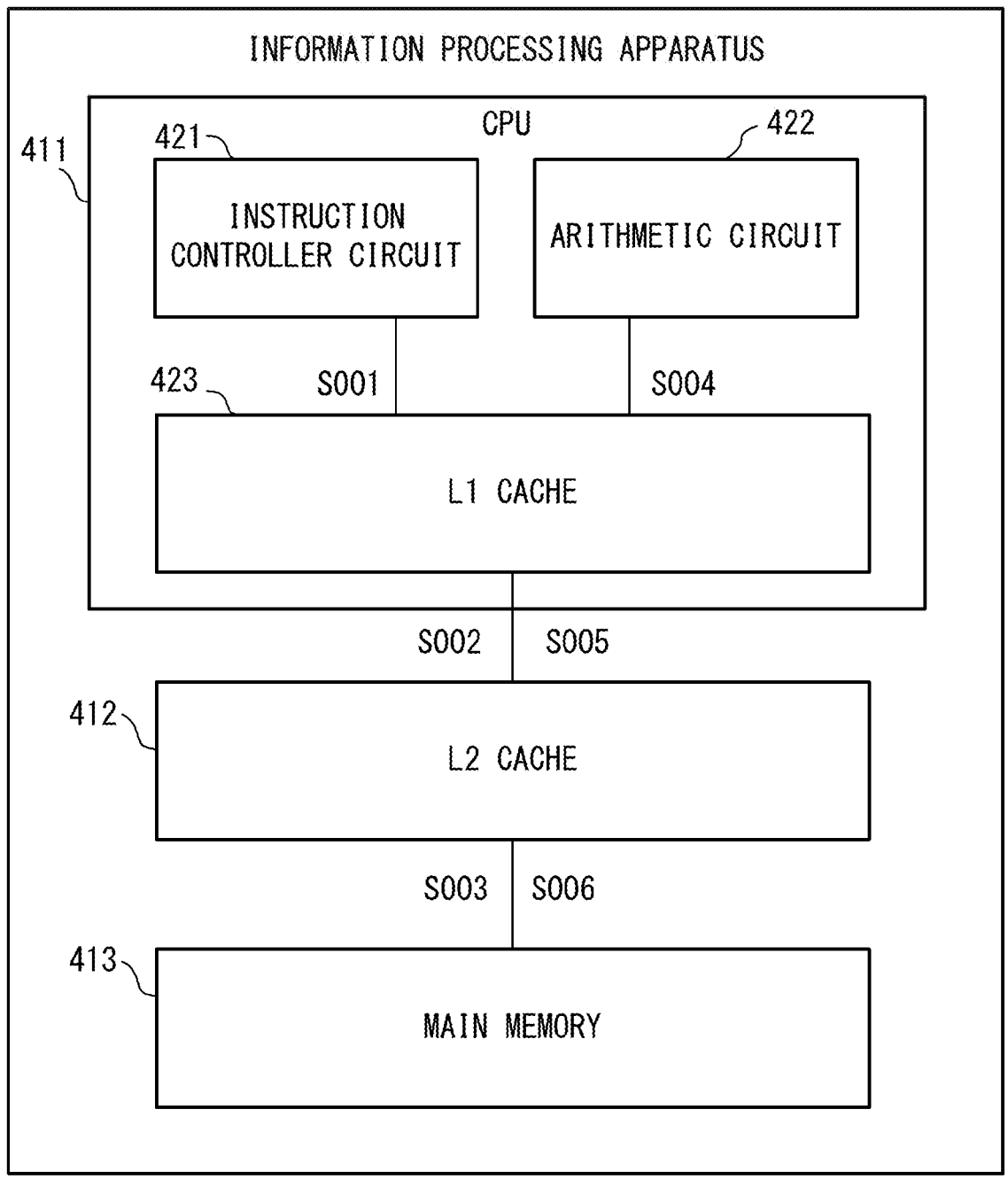
FIG. 4 is a diagram illustrating a configuration of an information processing apparatus.

FIG. 4 illustrates an example of a configuration of an information processing apparatus (computer) including the arithmetic processor 201 of FIG. 2. The information processing apparatus 401 in FIG. 4 includes a CPU 411 (processor), an L2 cache 412, and a main memory 413. The CPU 411 corresponds to the arithmetic processor 201 of FIG. 2 and includes an instruction controller circuit 421, an arithmetic circuit 422, and an L1 cache 423.

The main memory 413 is a semiconductor memory such as a Random Access Memory (RAM) as an example and stores data used by the CPU 411. The information stored in the main memory 413 may be instructions included in programs executed by the CPU 411 or may be data processed by the CPU 411 in accordance with instructions.

The L1 cache 423 is a cache memory circuit in the CPU 411, and the L2 cache 412 is a cache memory circuit in a lower level than the L1 cache 423. The L1 cache 423 and the L2 cache 412 temporarily store information read out from the main memory 413.

The instruction controller circuit 421 corresponds to the request generation circuit 211 of FIG. 2 and issues a request S001 to the L1 cache 423. The request S001 is, for example, an information request that requests an instruction or data stored in the main memory 413.

In a case of requesting data to be accessed that is stored in the main memory 413, the instruction controller circuit 421 outputs a data request to the L1 cache 423 as the request S001. When the data to be accessed is stored in the L1 cache 423, the L1 cache 423 outputs the data to be accessed to the arithmetic circuit 422 as data S004.

On the other hand, when the data to be accessed is not stored in the L1 cache 423, the L1 cache 423 outputs a data request S002 to the L2 cache 412. When the data to be accessed is stored in the L2 cache 412, the L2 cache 412 outputs the data to be accessed to the L1 cache 423 as data S005. The L1 cache 423 then outputs the data S005 to the arithmetic circuit 422 as data S004.

On the other hand, when the data to be accessed is not stored in the L2 cache 412, the L2 cache 412 outputs a data request S003 to the main memory 413. The main memory 413 outputs the data to be accessed to the L2 cache 412 as data S006. The L2 cache 412 then outputs the data S006 to the L1 cache 423 as data S005, and the L1 cache 423 outputs the data S005 to the arithmetic circuit 422 as data S004. The arithmetic circuit 422 performs an operation by using the data S004.

Figure 5:
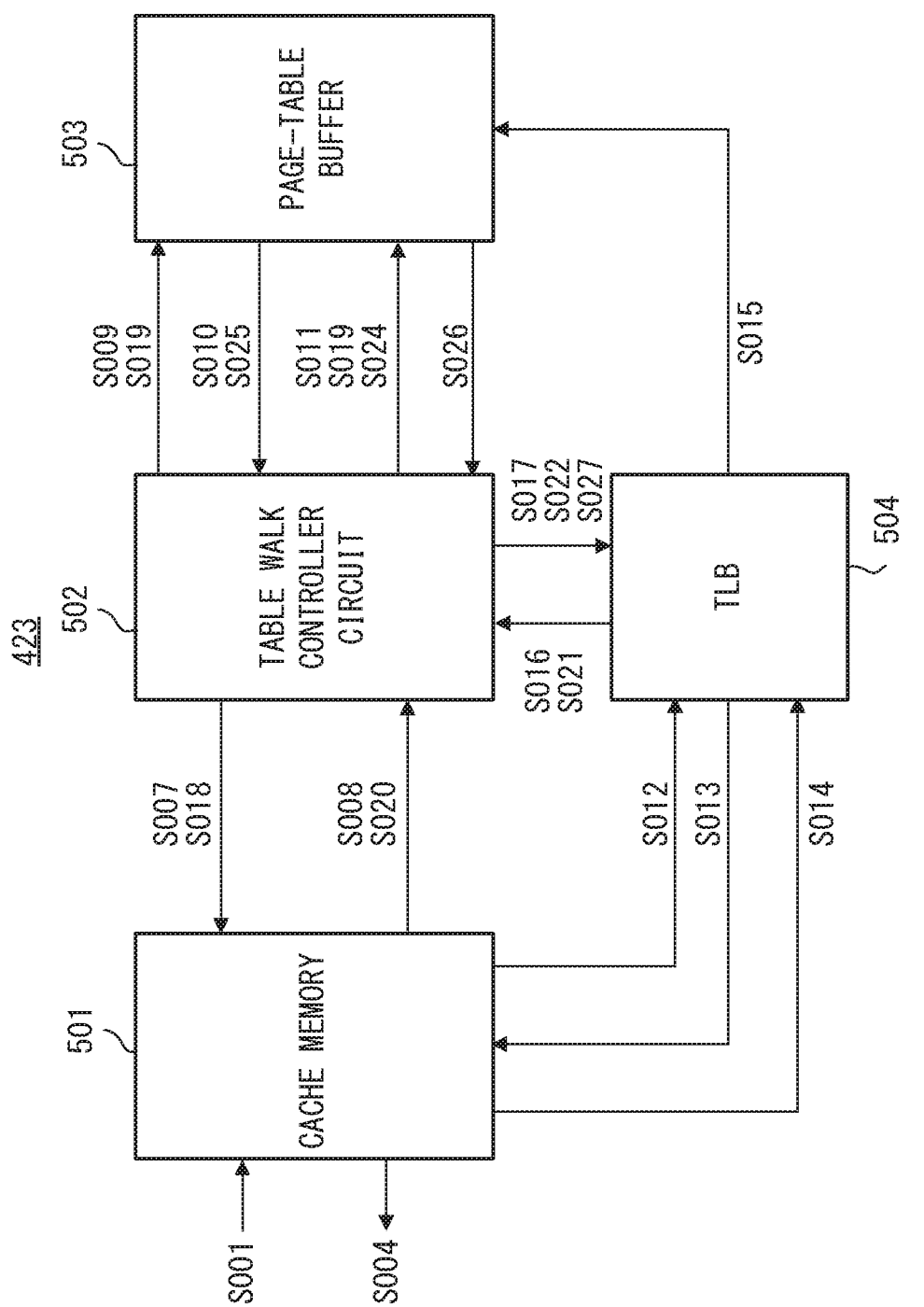
FIG. 5 is a diagram illustrating a configuration of a level 1 (L1) cache.

FIG. 5 illustrates an example of a configuration of the L1 cache 423 of FIG. 4. The L1 cache 423 of FIG. 5 is a L1 data cache and includes a cache memory 501, a table walk controller circuit 502, a page-table buffer 503, and a TLB 504. The table walk controller circuit 502, the page-table buffer 503, and the TLB 504 are hardware circuits and correspond to the controller circuit 212, the page-table buffer 214, and the translation buffer 213 of FIG. 2, respectively.

The TLB 504 associates the VA of a page with the PA of the page and stores the associated addresses. The page-table buffer 503 associates data in a page table in a level other than the last level with the PA of the data, and stores the associated data and address. The data in a page table may also be called a page table entry.

When a request S001 that is output from the instruction controller circuit 421 is a data request, the request S001 includes the VA of data to be accessed as a request address. The cache memory 501 receives the request S001 and outputs a translation request S012 to the TLB 504.

In the following description, a case in which the VA of a page that corresponds to the request address is stored in the TLB 504 may be referred to as a case in which the request address hits a TLB 504, and a case in which the VA of the page is not stored in the TLB 504 may be referred to as a TLB miss.

When the request address hits in the TLB 504, the TLB 504 outputs the PA that corresponds to the request address to the cache memory 501 as a translation result S013, and the cache memory 501 outputs data S004 corresponding to the translation result S013 to the arithmetic circuit 422.

On the other hand, in the case of a TLB miss, the TLB 504 outputs a table walk request including a control signal S016 and an address signal S021 to the table walk controller circuit 502. The control signal S016 indicates a table walk request and the address signal S021 indicates a request address.

The table walk controller unit 502 carries out the page-table walk in response to the table walk request and performs an address translation of the request address. The table walk controller unit 502 first obtains, from the request address, the PA of data in a page table to be accessed. The table walk controller unit 502 then conducts a search in the page-table buffer 503 by outputting a page table request including a control signal S009 and an address signal S019 to the page-table buffer 503. The control signal S009 indicates a page table request and the address signal S019 indicates the PA of data in the page table to be accessed.

When the PA of data in the page table to be accessed is stored in the page-table buffer 503, the page-table buffer 503 outputs page table information including a control signal S010 and a data signal S025 to the table walk controller circuit 502. The control signal S010 indicates a page table transfer and the data signal S025 indicates data in the page table to be accessed.

The table walk controller circuit 502 continues the page-table walk based on the data in the page table to be accessed. In this manner, by providing the page-table buffer 503, the table walk controller circuit 502 can promptly look up in the page table to be accessed without depending on the cache memory 501.

On the other hand, when the PA of data in the page table to be accessed is not stored in the page-table buffer 503, the page-table buffer 503 outputs a miss signal S026 to the table walk controller circuit 502. The table walk controller circuit 502 then outputs a page table request including a control signal S007 and an address signal S018 to the cache memory 501. The control signal S007 indicates a page table request and the address signal S018 indicates the PA of data in the page table to be accessed.

When the data in the page table to be accessed is stored in the cache memory 501, the cache memory 501 outputs page table information including a control signal S008 and a data signal S020 to the table walk controller circuit 502. The control signal S008 indicates a page table transfer and the data signal S020 indicates the data in the page table to be accessed.

On the other hand, when the data in the page table to be accessed is not stored in the cache memory 501, the L1 cache 423 requests the L2 cache 412 to provide the data and obtains the data in the page table to be accessed from the L2 cache 412. When the data in the page table to be accessed is not stored in the L2 cache 412, the L2 cache 412 requests the main memory 413 to provide the data and obtains the data in the page table to be accessed from the main memory 413.

The cache memory 501 outputs the page table information of the data obtained from the L1 cache 423 to the table walk controller circuit 502. In this case, the table walk controller circuit 502 outputs registration information including a control signal S011, an address signal S019, and a data signal S024 to the page-table buffer 503. In this manner, the data in the page table to be accessed is registered in the page-table buffer 503. The control signal S011 indicates a page table registration, the address signal S019 indicates the PA of the data in the page table to be accessed, and the data signal S024 indicates the data in the page table to be accessed.

From among the page tables in multiple levels included in the multilevel page table, the number of tables in the last level tends to be larger than the number of tables in any other level. Here, when the page table to be accessed is a table in the last level, the table walk controller circuit 502 blocks the page-table buffer 503 from registering the data in the page table to be accessed. As a result, the number of entries in the page-table buffer 503 can be significantly reduced and the hardware scale of the page-table buffer 503 becomes small.

When the page-table walk ends, the table walk controller circuit 502 outputs registration information including a control signal S017, an address signal S027, and an address signal S022 to the TLB 504. In this manner, the VA and the PA of the page including the data to be accessed are registered in the TLB 504. The control signal S017 indicates an address registration, the address signal S027 indicates the VA of the page including the data to be accessed, and the address signal S022 indicates the PA of the page.

Afterwards, the L1 cache 423 resumes the processing of the request S001, and the request address hits the TLB 504. The TLB 504 then outputs the PA that corresponds to the request address to the cache memory 501 as a translation result S013, and the cache memory 501 outputs the data S004 that corresponds to the translation result S013 to the arithmetic circuit 422.

When the CPU 411 rewrites a page table in the main memory 413, in order to resolve mismatches between VA-PA translation pairs in the TLB 504 and the page table in the main memory 413, the CPU 411 executes a TLB maintenance instruction. As a result, the instruction controller circuit 421 outputs a TLB maintenance request to the L1 cache 423 as a request S001.

When receiving the TLB maintenance request, the cache memory 501 outputs a maintenance signal S014 to the TLB 504. When receiving the maintenance signal S014, the TLB 504 invalidates the translation pairs in the TLB 504 and outputs an erase all signal S015 to the page-table buffer 503. When receiving the erase all signal S015, the page-table buffer 503 invalidates all entries in the page-table buffer 503.

Consequently, the use of data in the old page table, which does not match the rewritten page table, is prohibited.

By outputting the erase all signal S015 from the TLB 504 to the page-table buffer 503, it becomes possible to invalidate the page-table buffer 503 in conjunction with the invalidation of the TLB 504.

Figure 6:
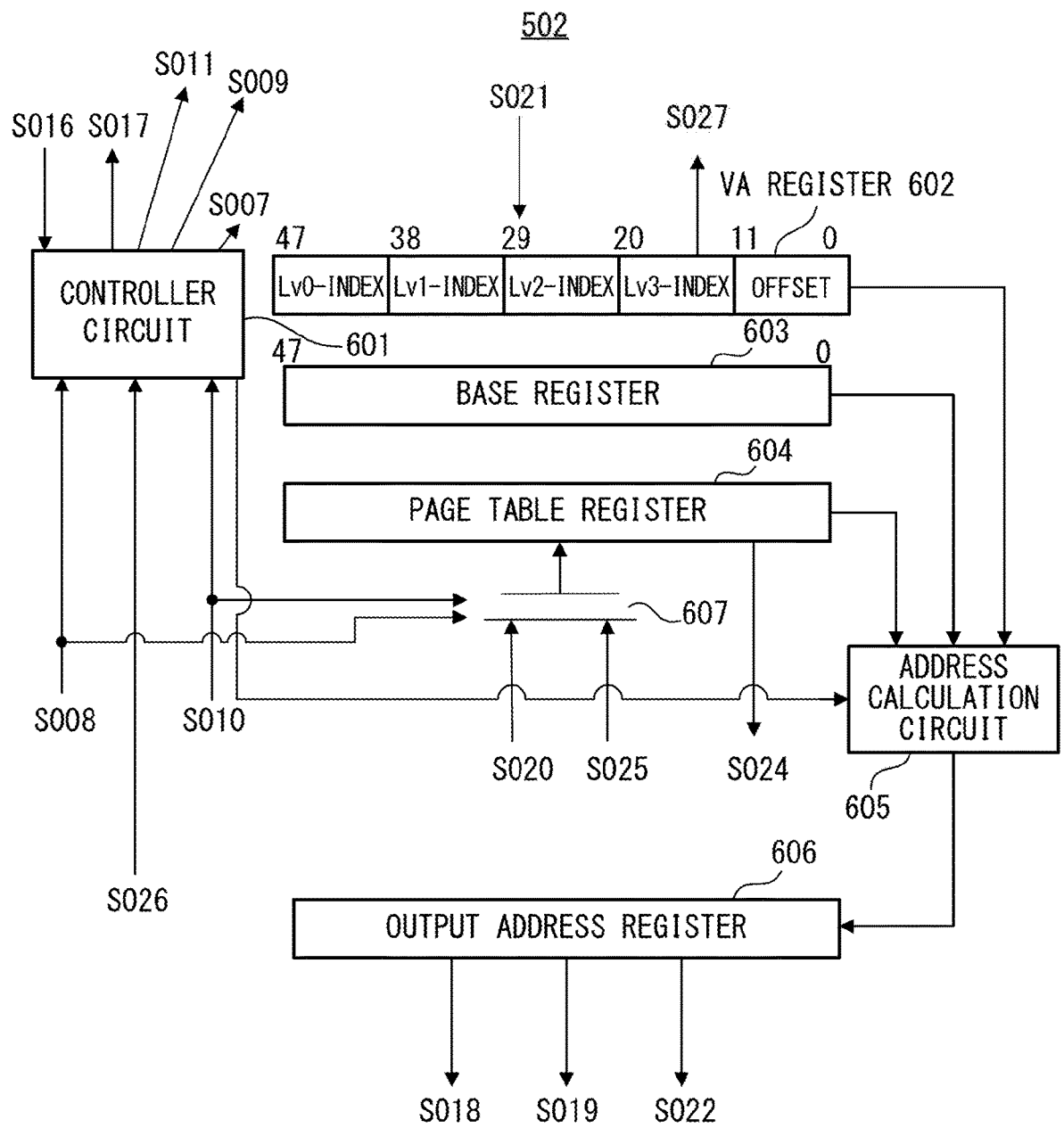
FIG. 6 is a diagram illustrating a configuration of a table walk controller circuit.

FIG. 6 illustrates an example of a configuration of the table walk controller circuit 502 of FIG. 5. The table walk controller circuit 502 of FIG. 6 includes a controller circuit 601, a VA register 602, a base register 603, a page table register 604, an address calculation circuit 605, an output address register 606, and a selector 607. The base register 603 corresponds to the base register 102 of FIG. 1 and stores TTBA.

When the TLB 504 outputs a table walk request, the control signal S016 is input to the controller circuit 601 and the request address indicated by the address signal S021 is stored in the VA register 602. In this example, VA 101 of FIG. 1 is stored in the VA register 602. The controller circuit 601 first shifts to a state to fetch a page table in Level 0 (Lv0-State).

In Lv0-State, the controller circuit 601 gives the address calculation circuit 605 an instruction to calculate the PA of data in the page table in Level 0. The address calculation circuit 605 adds Lv0-index stored in the VA register 602 to TTBA stored in the base register 603 and obtains the PA of the data in the page table in Level 0, as illustrated in FIG. 1. The address calculation circuit 605 then stores the obtained PA in the output address register 606, and the output address register 606 outputs an address signal S019 indicating the stored PA to the page-table buffer 503.

When the PA indicated by the address signal S019 is stored in the page-table buffer 503, the control signal 010 of logic "1" is input to the controller circuit 601 and the selector 607, and a data signal S025 is input to the selector 607. When the control signal S010 is logic "1", the selector 607 selects the data signal S025 and outputs the signal to the page table register 604. As a result, the data in the page table in Level 0 indicated by the data signal S025 is stored in the page table register 604.

On the other hand, when the PA indicated by the address signal S019 is not stored in the page-table buffer 503, a miss signal S026 is input to the controller circuit 601. In this case, the controller circuit 601 outputs a control signal S007 to the cache memory 501, and the output address register 606 outputs an address signal S018 indicating the PA to the cache memory 501.

Afterwards, the control signal S008 of logic "1" is input to the controller circuit 601 and the selector 607 from the cache memory 501, and a data signal S020 is input to the selector 607. When the control signal S008 is logic "1", the selector 607 selects the data signal S020 and outputs it to the page table register 604. Consequently, the data in the page table in Level 0 indicated by the data signal S020 is stored in the page table register 604.

When the data in the page table in Level 0 is obtained from the cache memory 501, the controller circuit 601 outputs a control signal S011 to the page-table buffer 503. In addition, the output address register 606 outputs an address signal S019 indicating the PA to the page-table buffer 503 and the page table register 604 outputs a data signal S024 indicating the data in the page table in Level 0 to the page-table buffer 503. Consequently, the data in the page table in Level 0 is registered in the page-table buffer 503.

When the controller circuit 601 receives the control signal S010 of logic "1" or the control signal S008 of logic "1", the controller circuit 601 shifts to a state to fetch a page table in Level 1 (Lv1-State).

In Lv1-State, the controller circuit 601 gives the address calculation circuit 605 an instruction to calculate the PA of data in the page table in Level 1. As illustrated in FIG. 1, the data in the page table in Level 0, which is stored in the page table register 604, includes Level1 Table Address.

Therefore the address calculation circuit 605 adds Lv1-index stored in the VA register 602 to the Level1 Table Address and obtains the PA of the data in the page table in Level 1. The address calculation circuit 605 stores the obtained PA in the output address register 606, and the output address register 606 outputs an address signal S019 indicating the stored PA to the page-table buffer 503.

When the PA indicated by the address signal S019 is stored in the page-table buffer 503, the page table register 604 stores the data in the page table in Level 1 output from the page-table buffer 503 as in LV0-State.

On the other hand, when the PA indicated by the address signal S019 is not stored in the page-table buffer 503, the page table register 604 stores the data in the page table in Level 1 output from the cache memory 501 also as in Lv0-State. In this case, as in Lv0-State, the data in the page table in Level 1 is registered in the page-table buffer 503.

Afterwards, the controller circuit 601 shifts to a state to fetch a page table in Level 2 (Lv2-State).

In Lv2-State, the controller circuit 601 gives the address calculation circuit 605 an instruction to calculate the PA of data in the page table in Level 2. As illustrated in FIG. 1, the data in the page table in Level 1, which is stored in the page table register 604, includes Level2 Table Address.

Therefore the address calculation circuit 605 adds Lv2-index stored in the VA register 602 to the Level2 Table Address and obtains the PA of the data in the page table in Level 2. The address calculation circuit 605 stores the obtained PA in the output address register 606, and the output address register 606 outputs an address signal S019 indicating the stored PA to the page-table buffer 503.

When the PA indicated by the address signal S019 is stored in the page-table buffer 503, the page table register 604 stores the data in the page table in Level 2 output from the page-table buffer 503 as in LV0-State.

On the other hand, when the PA indicated by the address signal S019 is not stored in the page-table buffer 503, the page table register 604 stores the data in the page table in Level 2 output from the cache memory 501 also as in Lv0-State. In this case, as in Lv0-State, the data in the page table in Level 2 is registered in the page-table buffer 503.

Afterwards, the controller circuit 601 shifts to a state to fetch a page table in Level 3 (Lv3-State).

In Lv3-State, the controller circuit 601 gives the address calculation circuit 605 an instruction to calculate the PA of data in the page table in Level 3. As illustrated in FIG. 1, the data in the page table in Level 2, which is stored in the page table register 604, includes Level3 Table Address.

Therefore the address calculation circuit 605 adds Lv3-index stored in the VA register 602 to the Level3 Table Address and obtains the PA of the data in the page table in Level 3. The address calculation circuit 605 stores the obtained PA in the output address register 606.

Because Level 3 is the last level, the controller circuit 601 outputs a control signal S007 to the cache memory 501, and the output address register 606 outputs an address signal S018 indicating the PA to the cache memory 501. Afterwards, as in Lv0-State, the page table register 604 stores the data in the page table in Level 3 output from the cache memory 501. As illustrated in FIG. 1, an output address is included in the data in the page table in Level 3.

The address calculation circuit 605 then adds an offset stored in the VA register 602 to the output address and obtains the PA of the data to be accessed. The output address register 606 stores the obtained PA. Afterwards, the controller circuit 601 outputs the control signal S017 to the TLB 504. The VA register 602 outputs an address signal S027 indicating LV3-index to the TLB 504, and the output address register 606 outputs an address signal S022 indicating the output address in the page table in Level 3 to the TLB 504. As a result, the VA and the PA of the page including the data to be accessed are registered in the TLB 504.

Figure 7:
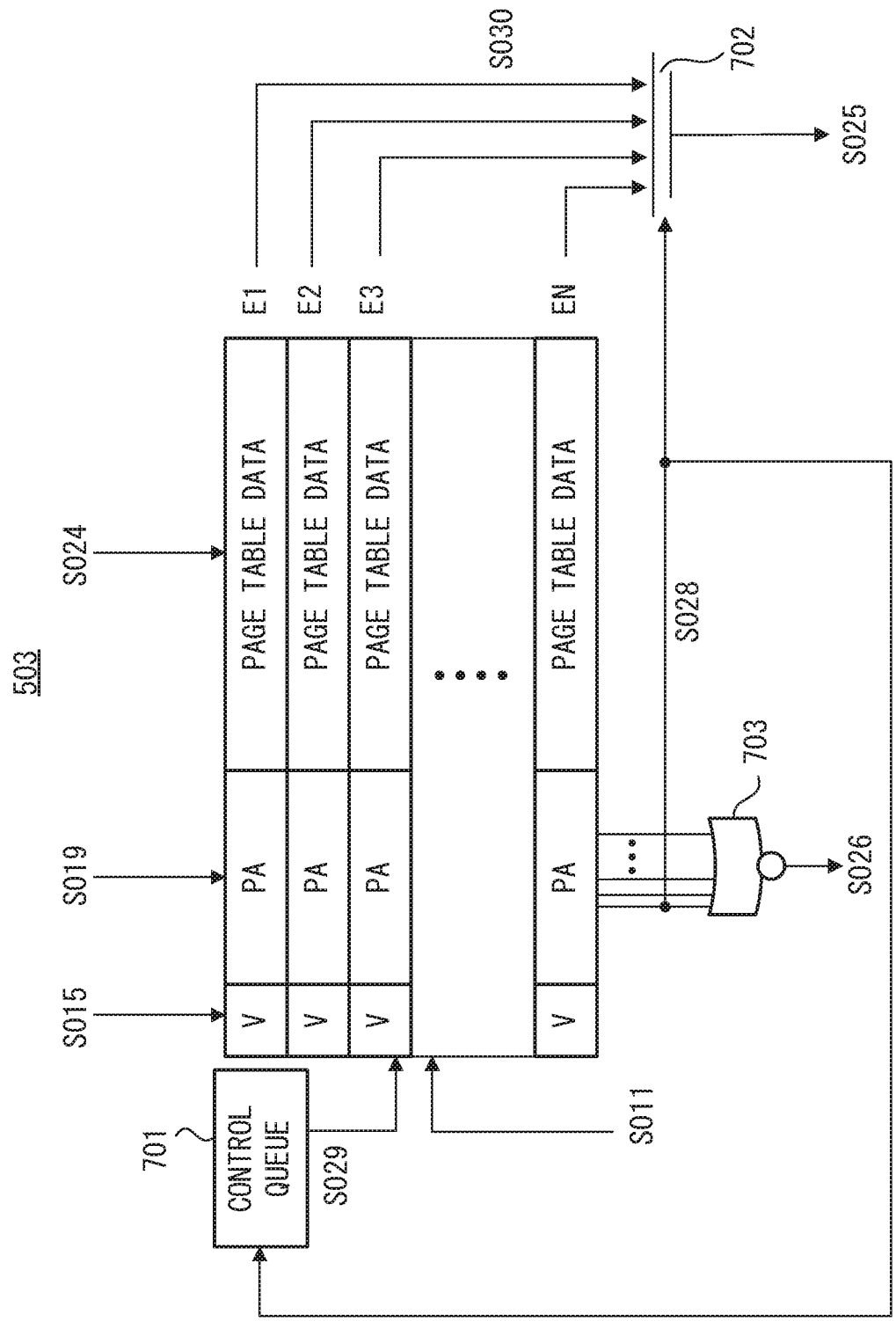
FIG. 7 is a diagram illustrating a configuration of a page-table buffer.

FIG. 7 illustrates an example of a configuration of the page-table buffer 503 of FIG. 5. The page-table buffer 503 of FIG. 7 includes N entries including entry E1 to entry EN (N is an integer that is equal to or greater than 1), a control queue 701, a selector 702, and a NOR circuit 703.

An entry Ei (i=1 to N) includes a valid bit V, PA, and page table data. The page table data represents data in a page table, and the PA represents the PA of the data in the page table. The valid bit V is a flag representing whether the entry Ei is valid or not. When the valid bit V is logic "1", the entry Ei is valid, and when the valid bit V is logic "0", the entry Ei is invalid.

At the time at which the table walk controller circuit 502 searches in the page-table buffer 503, the page-table buffer 503 receives an address signal S019 indicating the PA of the data in the page table from the table walk controller circuit 502. The PA indicated by the address signal S019 is compared with the PA included in each entry Ei and each entry Ei outputs a hit signal S028 indicating the comparison result to the control queue 701, the selector 702, and the NOR circuit 703.

When the PA indicated by the address single S019 matches the PA of the entry Ei, the hit signal S028 will be logic "1", and when PA indicated by the address single S019 does not match the PA of the entry Ei, the hit signal S028 will be logic "0".

Each entry Ei outputs a data signal S030 indicating page table data to the selector 702. Based on the control signals S028 output from the entry E1 to the entry EN, the selector 702 selects the data signal S030 of the entry indicated by the hit signal S028 of logic "1" and outputs the selected signal as a data signal S025.

The NOR circuit 703 outputs a logical NOR of the control signals S028 output from the entry E1 to the entry EN as a miss signal S026. Accordingly, when the PA indicated by the address signal S019 matches the PA of any of the entries, the miss signal S026 will be logic "0", and when the PA indicated by the address signal S019 does not match the PA of any of the entries, the miss signal S026 will be logic "1". When the miss signal S026 is at logic "1", the table walk controller circuit 502 outputs a control signal S007 and an address signal S018 to the cache memory 501.

Based on the hit signals S028, the control queue 701 generates a control signal S029 indicating an entry in which page table data is to be registered and outputs the control signal S029 to each of the entries. The control signal S029 for the entry in which page table data is to be registered will be logic "1", and the control signal S029 for the other entries will be logic "0".

At the time at which the table walk controller circuit 502 registers the data in the page table in the page-table buffer 503, the page-table buffer 503 receives a control signal S011, an address signal S019, and a data signal S024 from the table walk controller circuit 502. The PA indicated by the address signal S019 and the data in the page table indicated by the data signal S024 are stored in the entry indicated by the control signal S029 of logic "1", and the data in the entry is updated.

Figure 8:
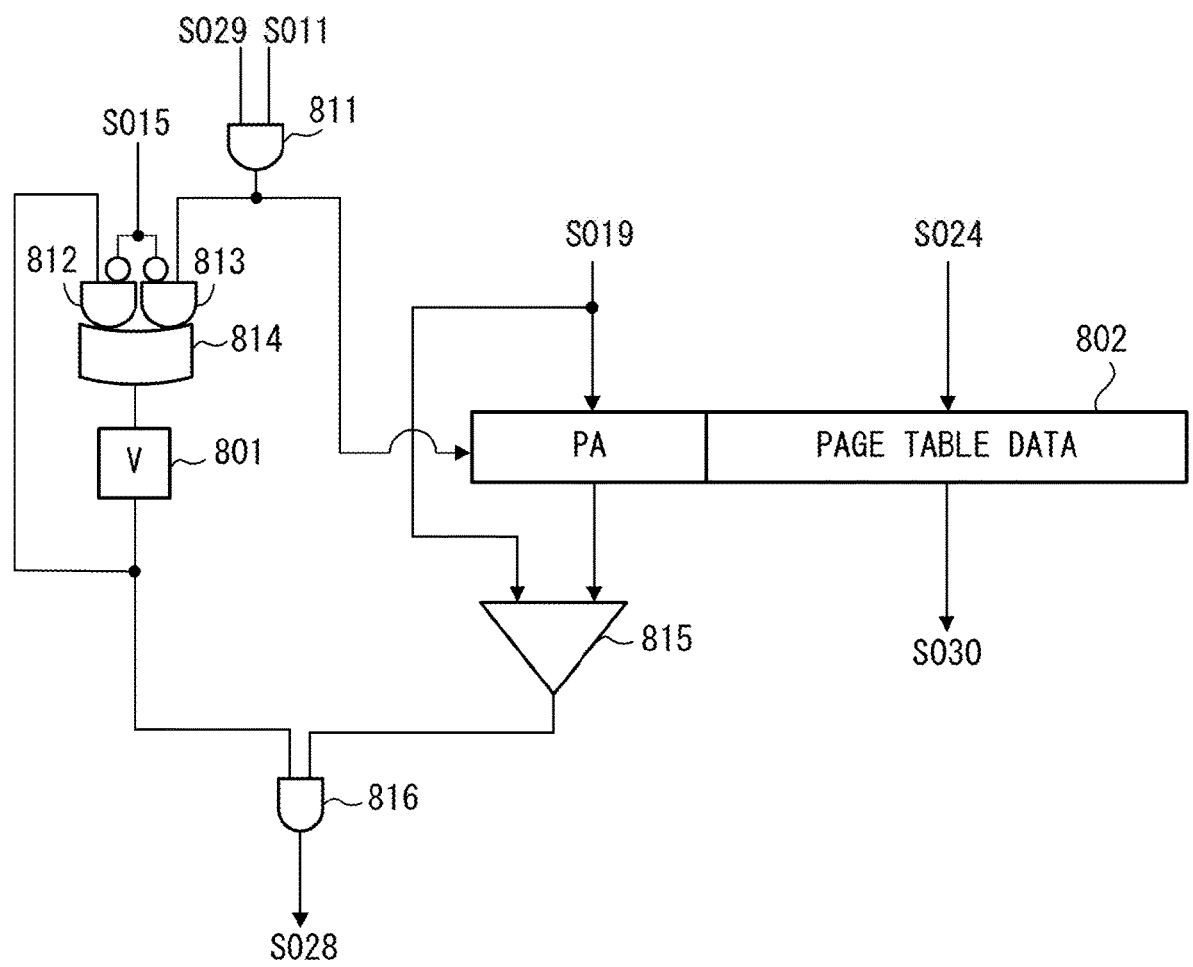
FIG. 8 is a diagram illustrating a configuration of a page table entry.

FIG. 8 illustrates an example of a configuration of an entry Ei of FIG. 7. The entry Ei of FIG. 8 includes a buffer 801, a buffer 802, AND circuits 811 to 813, an OR circuit 814, a comparison circuit 815, and an AND circuit 816. The buffer 801 stores a valid bit V, and the buffer 802 stores the PA and page table data.

The AND circuit 811 outputs a logical product of the control signal S011 and the control signal S029 to the AND circuit 813 and the buffer 802. When the table walk controller circuit 502 registers data in a page table in the page-table buffer 503, the control signal S011 will be logic "1", and the control signal S011 will be logic "0" in the other cases.

The AND circuit 812 outputs a logical product of negation of the erase all signal S015 and the valid bit V stored in the buffer 801. When the TLB 504 receives the maintenance signal S014 (not shown in FIG. 8), the erase all signal S015 will be logic "1", and the erase all signal S015 will be logic "0" in the other cases.

The AND circuit 813 outputs a logical product of negation of the erase all signal S015 and the output of the AND circuit 811 to the OR circuit 814. The OR circuit 814 outputs a logical sum of the output of the AND circuit 812 and the output of the AND circuit 813 to the buffer 801, and the buffer 801 retains the output of the OR circuit 814 as a valid bit V.

When the table walk controller circuit 502 searches in the page-table buffer 503, the comparison circuit 815 compares the PA indicated by the address signal S019 with the PA stored in the buffer 802 and outputs a comparison result to the AND circuit 816. When the PA indicated by the address signal S019 matches the PA in the buffer 802, the comparison result will be logic "1", and when the PA indicated by the address signal S019 does not match the PA in the buffer 802, the comparison result will be logic "0".

The AND circuit 816 outputs a logical product of the comparison result output from the comparison circuit 815 and the valid bit V stored in the buffer 801 as a hit signal S028, and the buffer 802 outputs a data signal S030 indicating page table data. Accordingly, the hit signal S028 will be logic "1" when the entry Ei is valid and the PA indicated by the address signal S019 matches the PA in the buffer 802.

When the table walk controller circuit 502 registers data in a page table in the page-table buffer 503, the control signal S011 will be logic "1". Accordingly, when the control signal S029 input to the entry Ei is logic "1", the output of the AND circuit 811 will be logic "1". As a result, the PA indicated by the address signal S019 and the data in the page table indicated by the data signal S024 are written in the buffer 802, and data of the entry Ei is updated. Consequently, because the output of the OR circuit 814 will at logic "1", the valid bit V in the buffer 801 will be set to logic "1".

When the erase all signal S015 of logic "1" is input to the page-table buffer 503, the output of the OR circuit 814 will be logic "0". As a result, because the valid bit V is set to logic "0" in all entries, all entries are invalidated.

FIG. 9 illustrates an example of a configuration of the control queue 701 of FIG. 7. The control queue 701 stores the order of use of entries E1 to EN by storing, in accordance with the LRU (Least Recently Used) algorithm, entry IDs that are identification information of the entries in an order in which the entries are used. N is 8 in this example.

An entry ID of an entry that is most recently used is stored at a position NEW in the control queue 701, and an entry ID of an entry that is least recently used is stored at a position OLD. The control queue 701 outputs the control signal S029 of logic "1" to the entry indicated by the entry ID at the position OLD and outputs the control signal S029 of logic "0" to entries indicated by entry IDs stored at the other positions.

For example, in a state ST1, the control signal S029 to the entry E5 stored at the position OLD is logic "1", and the control signal S029 to the other entries is logic "0". In the state ST1, when the hit signal S028 to the entry E3 is logic "1", the entry ID of the entry E3 moves to the position NEW as indicated by an arrow 901. Entry IDs of the entry E8, the entry E2, the entry E6, the entry E4, and the entry E1 sequentially shift toward the position OLD, and the control queue 701 changes to a state ST2.

However, because the entry ID at the position OLD does not change, the control signal S029 to the entry E5 is logic "1" and the control signal S029 to the other entries is logic "0" as in the state ST1. In the state ST2, when new page table data is registered in the entry E5 indicated by the control signal S029 of logic "1", the entry ID of the entry E5 moves to the position NEW as indicated by an arrow 902. Entry IDs of the rest of the entries sequentially shift toward the position OLD, and the control queue 701 changes to a state ST3.

In the state ST3, the control signal S029 to the entry E7 stored at the position old is logic "1", and the control signal S029 to the other entries is logic "0".

As described above, by providing the control queue 701 and by determining the entry to register page table data in accordance with the LRU algorithm, entries in the page-table buffer 503 can be effectively used. As a result, the hardware scale of the page-table buffer 503 becomes small.

Figure 10:
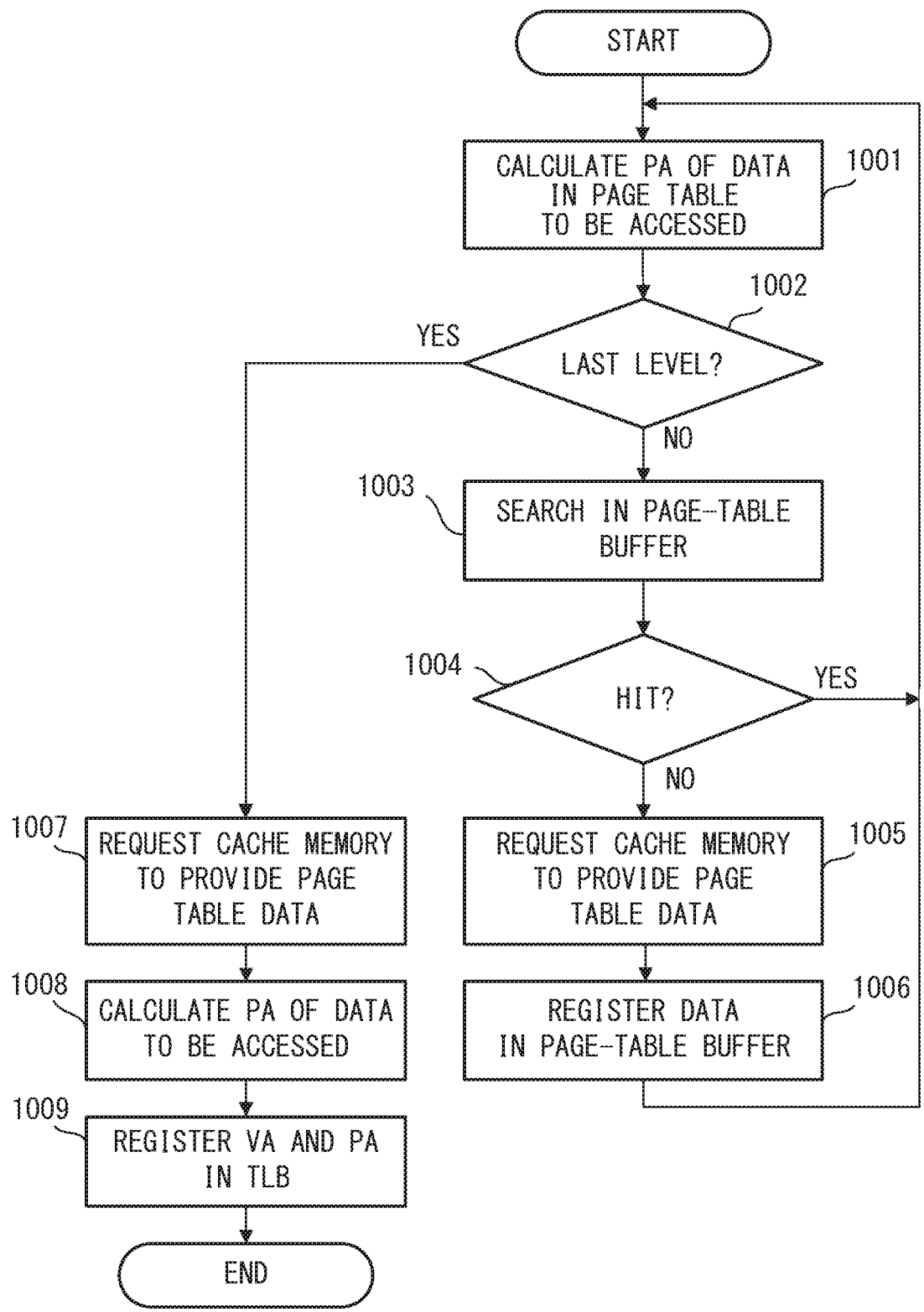
FIG. 10 is a flowchart illustrating operations of a table walk controller circuit.

FIG. 10 is a flowchart illustrating an example of operations performed when the table walk controller circuit 502 receives a table walk request from the TLB 504. In accordance with an instruction from the controller circuit 601, the address calculation circuit 605 first calculates the PA of data in a page table to be accessed by using the VA of the data to be accessed (step 1001). The controller circuit 601 checks whether or not the page table to be accessed is a page table in the last level (step 1002).

When the page table to be accessed is a page table in a level other than the last level (step 1002, NO), the controller circuit 601 searches for data in the page table to be accessed in the page-table buffer 503 (step 1003). The controller circuit 601 then checks whether or not the PA of the data in the page table to be accessed hits in the page-table buffer 503 (step 1004).

When a control signal S010 of logic "1" is received from the page-table buffer 503, it is determined that the PA of the data in the page table to be accessed hits in the page-table buffer 503. On the other hand, when a miss signal S026 of logic "1" is received from the page-table buffer 503, it is determined that the PA of the data in the page table to be accessed does not hit in the page-table buffer 503.

When the PA of the data in the page table to be accessed hits in the page-table buffer 503 (step 1004, YES), the table walk controller circuit 502 obtains, from the page-table buffer 503, the data in the page table to be accessed. The table walk controller circuit 502 then repeats the operations in step 1001 and the subsequent steps using a page table in the next level as the page table to be accessed.

On the other hand, when the PA of the data in the page table to be accessed does not hit in the page-table buffer 503 (step 1004, NO), the controller circuit 601 requests the cache memory 501 to provide the data (step 1005). The table walk controller circuit 502 obtains, from the cache memory 501, the data in the page table to be accessed.

Next, the controller circuit 601 registers the obtained data in the page-table buffer 503 (step 1006) and repeats the operations in step 1001 and the subsequent steps using a page table in the next level as the page table to be accessed.

When the page table to be accessed is a page table in the last level (step 1002, YES), the controller circuit 601 requests the cache memory 501 to provide the data in the page table to be accessed (step 1007). The table walk controller circuit 502 then obtains, from the cache memory 501, the data in the page table to be accessed.

Next, in accordance with an instruction from the controller circuit 601, the address calculation circuit 605 calculates the PA of data to be accessed by using the VA of the data to be accessed and an output address included in the obtained data (step 1008). The controller circuit 601 then registers the VA and the PA of the page including the data to be accessed in the TLB 504 (step 1009).

The page-table walk of FIG. 1 is merely an example, and the number of levels in the multilevel page table, the VA of data to be accessed, and others, may be changed in accordance with the configuration and conditions of the information processing apparatus.

The configuration of the arithmetic processor 201 of FIG. 2 is merely an example, and some components may be omitted or modified in accordance with the usage or conditions of the arithmetic processor 201.

The configuration of the information processing apparatus 401 of FIG. 4 is merely an example, and some components may be omitted or modified in accordance with the usage or conditions of the information processing apparatus 401. For example, when the CPU 411 directly obtains data from the main memory 413, the L2 cache 412 can be omitted.

The information processing apparatus 401 may include an auxiliary storage device such as a hard disk drive, an input device such as a keyboard and a pointing device, or an output device such as a display device. In addition, the information processing apparatus 401 may include a media driver device such as CD-ROM (Compact Disk Read Only Memory) drive, or a communication device such as a network interface card (NIC).

The configuration of the L1 cache 423 of FIG. 5 is merely an example, and some components may be omitted or modified in accordance with the usage or conditions of the information processing apparatus 401. For example, when the CPU 411 directly obtains data from the main memory 413, the cache memory 501 can be omitted. When the cache memory 501 and the L2 cache 412 are omitted, the table walk controller circuit 502 requests the main memory 413 to provide data in a page table to be accessed and obtains the data from the main memory 413.

The level 1 (L1) cache 423 may be a L1 instruction cache. When the L1 cache 423 is a L1 instruction cache, the request S001 is an information request that requests an instruction and includes the VA of an instruction to be accessed as a request address. In this case, the cache memory 501 outputs an instruction to be accessed instead of the data S004.

Configurations of the table walk controller circuit 502 of FIG. 6, the page-table buffer 503 of FIG. 7, the page table entry of FIG. 8, and the control queue 701 of FIG. 9 are merely examples and some components can be omitted or modified in accordance with the usage or conditions of the information processing apparatus 401.

The flowcharts of FIG. 3 and FIG. 10 are merely examples, and some processing may be omitted or modified in accordance with the configuration or conditions of the arithmetic processor 201 or the information processing apparatus 401. For example, when the cache memory 501 and the L2 cache 412 are omitted, in step 1005 and step 1007 of FIG. 10, the controller circuit 601 requests the main memory 413 to provide data in a page table to be accessed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processor, comprising:
a request generation circuit configured to generate an information request including a request address;
a translation buffer configured to associate a virtual address of a page with a physical address of the page and to store the virtual address and the physical address;
a page-table buffer configured to associate data in a page table in a level other than the last level with a physical address of the data in the page table and to store the data in the page table and the physical address of the data in the page table; and
a controller circuit configured to obtain, from the request address, a physical address of data in a page table to be accessed when a virtual address that corresponds to the request address is not stored in the translation buffer, to search in the page-table buffer for the data in the page table to be accessed when the page table to be accessed is a page table in a level other than the last level, to obtain, from a memory, the data in the page table to be accessed when the page table to be accessed is a page table in the last level, and to register, in the translation buffer, a virtual address and a physical address of a page indicated by the obtained data.

2. The arithmetic processor according to claim 1, wherein
the page-table buffer includes a plurality of entries and a control queue,
each of the plurality of entries includes data in a page table and a physical address of the data in the page table,
the controller circuit obtains, from the memory, the data in the page table to be accessed and outputs the data in the page table to be accessed to the page-table buffer when the page table to be accessed is a page table in a level other than the last level and the physical address of the data in the page table to be accessed is not stored in the page-table buffer,
the control queue stores an order of use of the plurality of entries and outputs a control signal indicating a least recently used entry from among the plurality of entries, and
the page-table buffer registers in the least recently used entry indicated by the control signal the data in the page table to be accessed and the physical address of the data in the page table to be accessed.

3. The arithmetic processor according to claim 2, wherein
the translation buffer outputs an erase signal to the page-table buffer when a virtual address and a physical address in the translation buffer are invalidated, and
the page-table buffer invalidates all entries in the page-table buffer in response to the erase signal.

4. The arithmetic processor according to claim 1, wherein the memory is a cache memory or a main memory.

5. An information processing apparatus, comprising:
a main memory configured to store information and a page table;
a request generation circuit configured to generate an information request including a request address,
a translation buffer configured to associate a virtual address of a page with a physical address of the page and to store the virtual address and the physical address;
a page-table buffer configured to associate data in a page table in a level other than the last level with a physical address of the data in the page table and to store the data in the page table and the physical address of the data in the page table; and
a controller circuit configured to obtain, from the request address, a physical address of data in a page table to be accessed when a virtual address that corresponds to the request address is not stored in the translation buffer, to search in the page-table buffer for the data in the page table to be accessed when the page table to be accessed is a page table in a level other than the last level, to obtain, from the main memory, the data in the page table to be accessed when the page table to be accessed is a page table in the last level, and to register, in the translation buffer, a virtual address and a physical address of a page indicated by the obtained data.

6. The information processing apparatus according to claim 5, wherein
the page-table buffer includes a plurality of entries and a control queue,
each of the plurality of entries includes data in a page table and a physical address of the data in the page table,
the controller circuit obtains, from the main memory, the data in the page table to be accessed and outputs the data in the page table to be accessed to the page-table buffer when the page table to be accessed is a page table in a level other than the last level and the physical address of the data in the page table to be accessed is not stored in the page-table buffer,
the control queue stores an order of use of the plurality of entries and outputs a control signal indicating a least recently used entry from among the plurality of entries, and
the page-table buffer registers in the least recently used entry indicated by the control signal the data in the page table to be accessed and the physical address of the data in the page table to be accessed.

7. The information processing apparatus according to claim 6, wherein
the translation buffer outputs an erase signal to the page-table buffer when a virtual address and a physical address in the translation buffer are invalidated, and
the page-table buffer invalidates all entries in the page-table buffer in response to the erase signal.

8. A control method of an arithmetic processor, comprising:
generating an information request including a request address;

obtaining, from the request address, a physical address of data in a page table to be accessed when a virtual address that corresponds to the request address is not stored in a translation buffer that associates a virtual address of a page with a physical address of the page and stores the virtual address of the page and the physical address of the page;

searching, in a page-table buffer that associates data in a page table in a level other than the last level with a physical address of the data in a page table in a level other than the last level, for the data in the page table to be accessed when the page table to be accessed is a page table in a level other than the last level;

obtaining, from a memory, the data in the page table to be accessed when the page table to be accessed is a page table in the last level; and registering, in the translation buffer, a virtual address and a physical address of a page indicated by the obtained data.

9. The control method of the arithmetic processor according to claim 8, further comprising:

obtaining, from the memory, the data in the page table to be accessed and outputting the data in the page table to be accessed to the page-table buffer when the page table to be accessed is a page table in a level other than the last level and the physical address of the data in the page table to be accessed is not stored in the page-table buffer; and registering, in a least recently used entry that is indicated by a control signal output from a control queue, the data in the page table to be accessed and the physical address of the data in the page table to be accessed, wherein the control queue stores an order of use of a plurality of entries in the page-table buffer.

10. The control method of the arithmetic processor according to claim 9 further comprising:

outputting an erase signal to the page-table buffer from the translation buffer when a virtual address and a physical address in the translation buffer are invalidated; and invalidating an entry in the page-table buffer in response to the erase signal.

11. The control method of the arithmetic processor according to claim 8, wherein the memory is a cache memory or a main memory.

* * * * *

UNITED STATES PATENT AND TRADEMARK OFFICE
CERTIFICATE OF CORRECTION

Page 1 of 1

PATENT NO. : 10,929,306 B2
APPLICATION NO. : 16/418018
DATED : February 23, 2021
INVENTOR(S) : Yuji Shirahige It is certified that error appears in the above-identified patent and that said Letters Patent is hereby corrected as shown below:

On the Title Page

Item (54) and in the Specification, Column 1 Lines 1-3, insert the following:
--ARITHMETIC PROCESSOR, INFORMATION PROCESSING APPARATUS, AND CONTROL METHOD OF ARITHMETIC PROCESSOR USING DIFFERENT PAGE TABLE LEVELS AND A PAGE-TABLE BUFFER--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*